United States Patent
Zobrist et al.

(10) Patent No.: US 9,195,242 B2
(45) Date of Patent: Nov. 24, 2015

(54) ENERGY MANAGEMENT SYSTEM AND METHOD FOR WATER HEATER SYSTEM

(76) Inventors: Derek Zobrist, Venice, CA (US); Gabriel Ayala, Venice, CA (US); Larry K Acker, Newport Beach, CA (US); Robert Jones, Costa Mesa, CA (US)

(*) Notice: Subject to any disclaimer, the term of this patent is extended or adjusted under 35 U.S.C. 154(b) by 1037 days.

(21) Appl. No.: 13/066,752

(22) Filed: Apr. 21, 2011

(65) Prior Publication Data
US 2012/0271465 A1 Oct. 25, 2012

(51) Int. Cl.
G05D 23/19 (2006.01)
F24D 19/10 (2006.01)

(52) U.S. Cl.
CPC ........ G05D 23/1917 (2013.01); F24D 19/1051 (2013.01); G05D 23/19 (2013.01)

(58) Field of Classification Search
CPC ............. H02J 13/001; H02J 2003/003; H02J 2003/146; H02J 3/005; G06Q 50/06; Y02B 70/3225; Y02B 70/3266; Y02B 70/3241; Y02B 30/12; Y02B 90/2669; Y04S 20/222; Y04S 20/242; Y04S 20/224; Y04S 20/227
See application file for complete search history.

(56) References Cited

U.S. PATENT DOCUMENTS

| | | |
|---|---|---|
| 4,936,289 A | 6/1990 | Peterson |
| 4,945,942 A | 8/1990 | Lund |
| 5,042,524 A | 8/1991 | Lund |
| 5,056,712 A | 10/1991 | Enck |
| 5,277,219 A | 1/1994 | Lund |
| 5,385,168 A | 1/1995 | Lund |
| 5,829,475 A | 11/1998 | Acker |
| 6,293,471 B1 * | 9/2001 | Stettin et al. ............. 236/20 R |
| 6,962,162 B2 | 11/2005 | Acker |
| 7,779,857 B2 | 8/2010 | Acker |
| 8,327,873 B2 | 12/2012 | Acker |
| 8,505,498 B2 | 8/2013 | Acker |
| 8,523,001 B2 | 9/2013 | Acker |
| 8,594,853 B2 | 11/2013 | McNamara et al. |
| 8,606,092 B2 * | 12/2013 | Amiran et al. ............. 392/441 |
| 2009/0145490 A1 * | 6/2009 | Kershisnik ................. 137/334 |
| 2009/0223465 A1 * | 9/2009 | Yamaoka et al. .......... 122/14.22 |

FOREIGN PATENT DOCUMENTS

WO   WO2009/144710   * 12/2009   ............. F24H 9/20

* cited by examiner

*Primary Examiner* — Sean Shechtman
(74) *Attorney, Agent, or Firm* — Larry K. Roberts

(57) ABSTRACT

An energy management system and method for water heater system is arranged for control of the water heater system based on user demand, and control the hot water distribution base on demand and water temperature of the recirculation loop. The energy management system includes a control center collecting operational parameter of the water heater system and real time information of hot water usage at each of user points, and a management center for managing operational parameter of the water heater system and real time information of hot water usage, wherein the management center is preset for automatically turning each of a motorized unit and a water heater unit of the water heater system in an on and off manner in responsive to hot water demand at user point so as to optimize energy saving of the water heater system.

26 Claims, 4 Drawing Sheets

ENERGY MANAGEMENT SYSTEM AND METHOD FOR WATER HEATER SYSTEM

BACKGROUND OF THE PRESENT INVENTION

1. Field of Invention

The present invention relates to an energy management system, and more particularly to an energy management system and method for monitoring and controlling the water heater system and the delivery of hot water to the point of use so as to optimize energy efficiency and reducing energy consumption while increasing reliability and durability of the water heater system.

2. Description of Related Arts

Energy crisis has called people's attention to energy availability and hence energy consumption and efficiency. Conventional hot water arrangement, such as water heater or boiler, is an essential household appliance for supplying hot water. However, much concern is paid to the energy management of the conventional hot water arrangement or heater. The heat insulation of the boiler or the heating device is mainly concerned for improvement of energy efficiency while the related pumping or transportation of water is greatly neglected. That is, conventional water heaters fail to provide a cohesive energy management approach in view of energy saving purpose.

Another major cause of energy loss of the water heater is poor maintenance or lack of alerts. For examples, hot water leakage or pump malfunction problems won't be detected easily, probably not until the water heater is malfunctioned or the leakage is severe enough to cause flooding. In view of the widely use of water heater in every single household, much energy is wasted, just because of poor management, and lack of detection and alert mechanisms.

Another problem related to maintenance of water heater is its dependency on on-site inspections. The fact that the water heater location may be scattered everywhere in every single family property structure, apartment structure, small and large commercial building structures makes it really impossible to have a centralized manageable system. There is no simple or easy way for central maintenance.

There exists management systems for a commercial building for tracking and controlling HVAC and lighting. However, this kind of system is very expensive and involves heavy construction, building design and wiring concerns. It is only cost effective and energy efficient for commercial building having a certain size. In other words, there is no such kind of energy management system designed for residential or small scale commercial buildings.

SUMMARY OF THE PRESENT INVENTION

The invention is advantageous in that it provides a central hot water system which monitors, controls and provides diagnostics features to different components of the water heater system in a cohesive manner so as to optimize the overall efficiency and functionality of the water heater system while minimize energy consumption with enhanced reliability and durability.

Another advantage of the invention is to provide a central hot water system which is cost effective for a small scale commercial, multi-family and single-family building structure, wherein the water heater system includes a control system for monitoring, controlling and diagnosing different components of the water system, such that the water system is operated in a cohesive manner.

Another advantage of the invention is to provide a central hot water system which includes a control system arranged for off-site communications such that remote access and control of the water system are achieved.

Another advantage of the invention is to provide a central hot water system which includes a control system comprising a control center having a plurality of standard set points operatively communicated with a plurality of sensor units, and a communication unit adapted for two-ways communications with an off-site user terminal, such that fault detection through the on-site sensor units and the central unit is made available for alert generation to the off-site user terminal and hence proper operation of the water system is monitored on a real-time basis.

Additional advantages and features of the invention will become apparent from the description which follows, and may be realized by means of the instrumentalities and combinations particularly pointed out in the appended claims.

According to the present invention, the foregoing and other objects and advantages are attained by an energy management system for water heater systems, wherein the water heater system comprises a water heater unit for heating up water and a motorized unit circulating hot water in a recirculation loop to define one or more user points thereat. The energy management system comprises a control center and a management center.

The control center is arranged for collecting operational parameters of the water heater system and for collecting real time information of hot water usage at each of the user points.

The management center is operatively linked to the control center for managing the operational parameters of the water heater system and the real time information of the hot water usage, wherein the management center is preset for automatically turning each of the motorized unit and the water heater unit in an on and off manner in responsive to hot water demand at a user point so as to optimize energy saving of the water heater system.

The energy management system further comprises a diagnostic center for diagnosing the operational parameters of the water heater system for promptly and accurately optimizing an operation of the water heater system in a real time basis, and a user interface for configuring the operational parameters of the water heater system and the real time information of hot water usage at the user points in a digitalized manner so as to enable the management center to be selectively configured to optimize the operation of the water heater system.

In accordance with another aspect of the invention, the present invention further comprises a method of energy management for a water heater system which comprises the steps of:

(a) collecting operational parameters of the water heater system and collecting real time information of hot water usage by user points of the water heater system;

(b) managing the operational parameters of the water heater system and the real time information of the hot water usage for automatically turning the motorized unit and the water heater unit in an on and off manner in responsive to hot water demand at a user point so as to optimize energy saving of said water heater system;

(c) diagnosing the operational parameters of the water heater system for promptly and accurately optimizing an operation of the water heater system in a real time basis; and (d) selectively configuring the operational parameters of said water heater system and the real time information of hot water usage at the user points in a digitalized manner.

Still further objects and advantages will become apparent from a consideration of the ensuing description and drawings.

DETAILED DESCRIPTION OF THE PREFERRED EMBODIMENT

Figure 1:
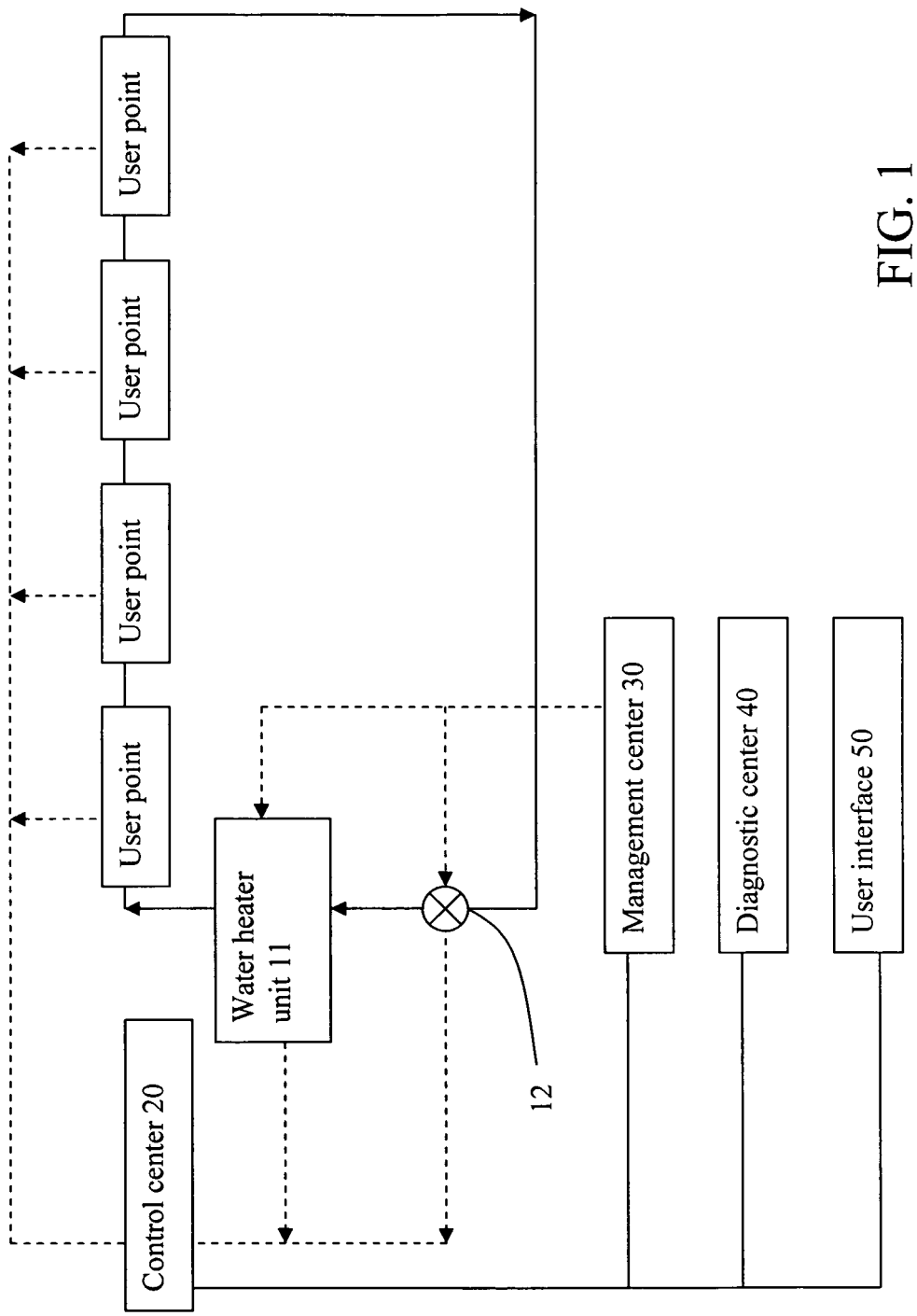
FIG. 1 is a schematic view illustrating a water heater system incorporating with an energy management system according to the preferred embodiment of the present invention.
Figure 2:
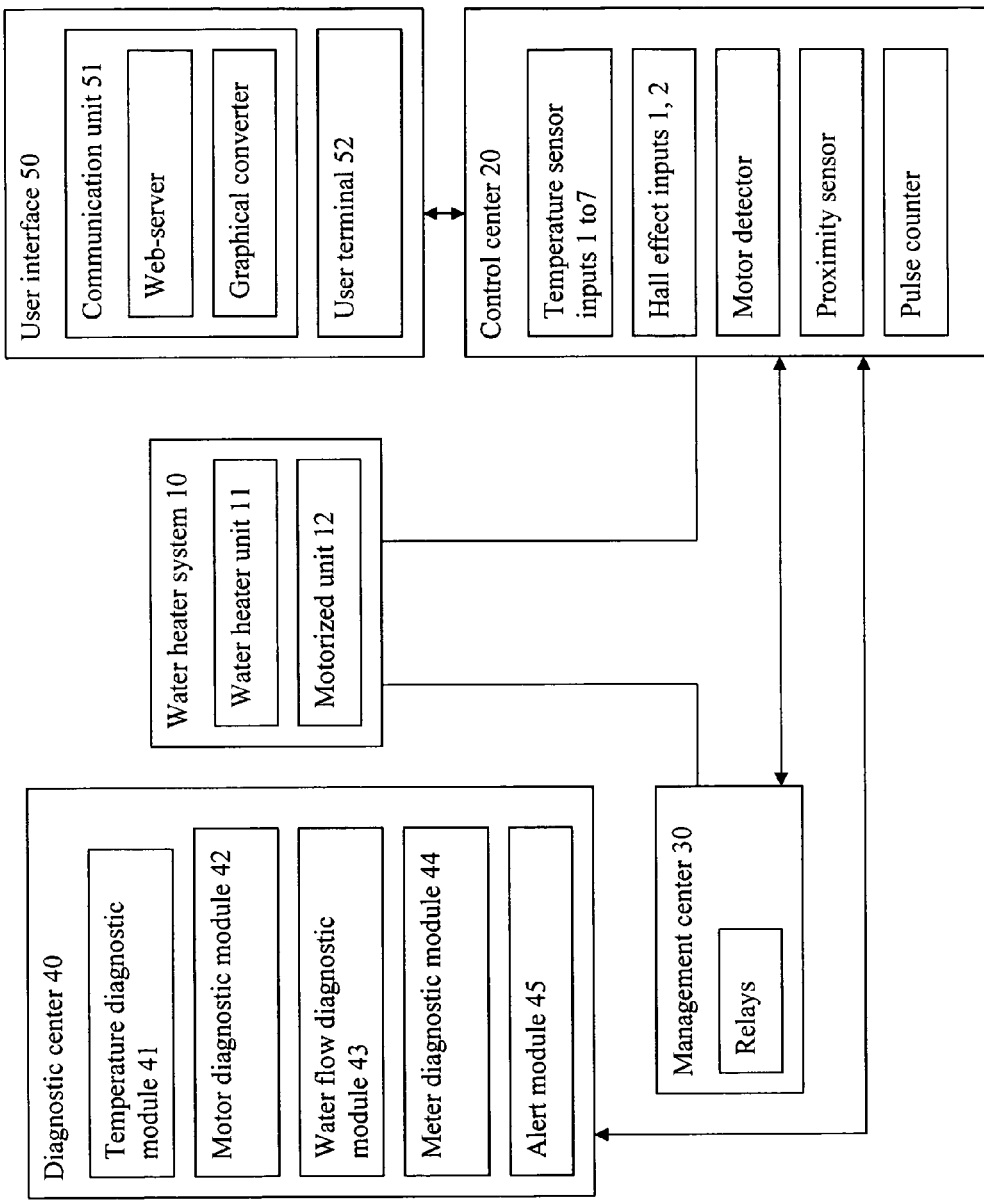
FIG. 2 is a block diagram of the energy management system according to the above preferred embodiment of the present invention.
Figure 3:
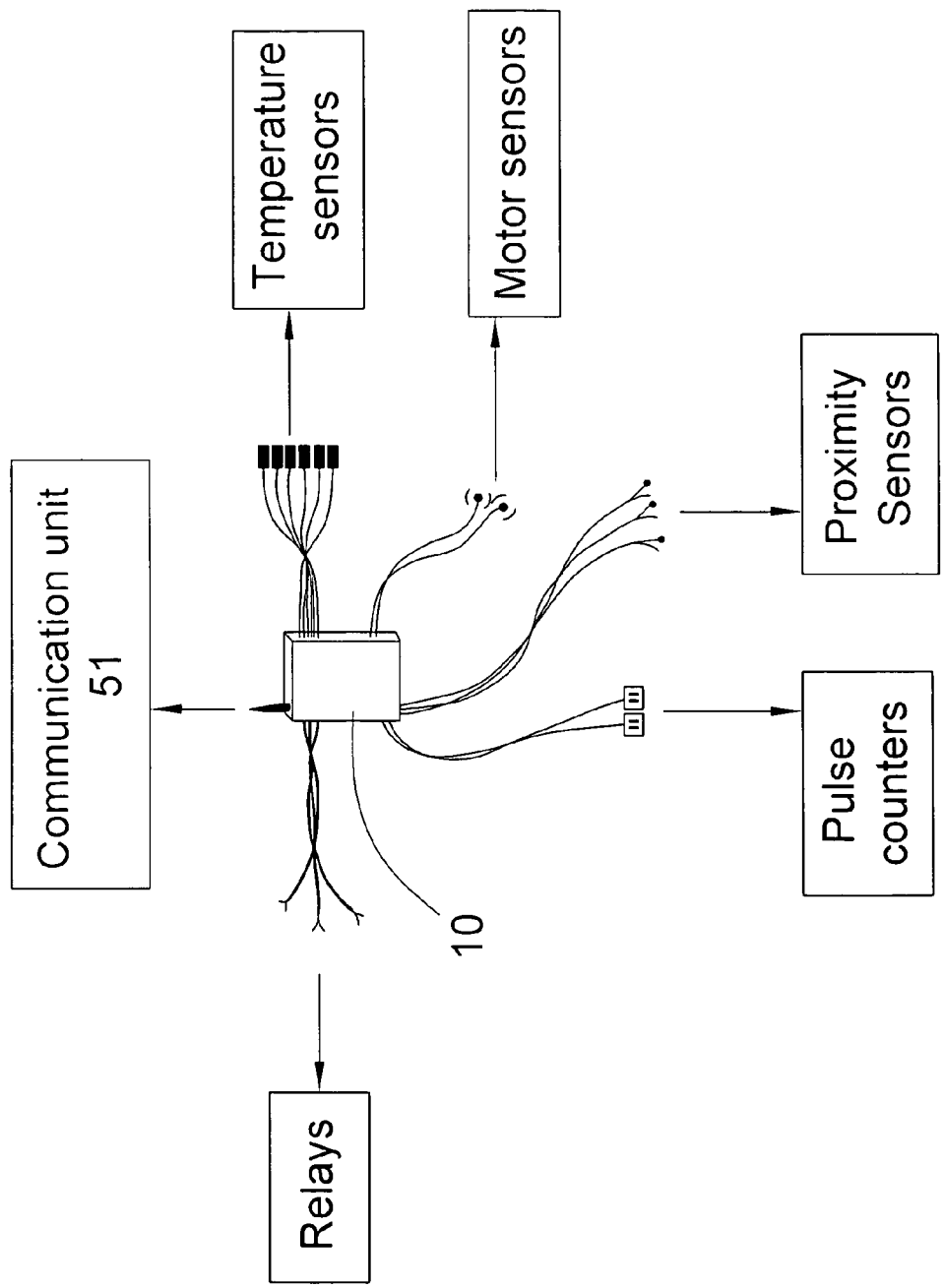
FIG. 3 is a schematic view of the energy management system according to the above preferred embodiment of the present invention.

Referring to FIGS. 1 and 2 of the drawings, a water heater system 10 with an energy management system according to the preferred embodiment of the present invention is illustrated, wherein the water heater system can be embodied as a central domestic hot water system (CDHW) in a commercial or multifamily building.

In particular, the water energy management system is arranged for monitoring, controlling and maintaining different components of the water heater system 10 through such that both water temperature reset based on demand and hot water delivery on demand are monitored and controlled, so as to save energy consumption. The water energy management system can be incorporated into an existing water heater system 10 or integrally embodied into a new water heater system 10 to form a central water heater arrangement.

As shown in FIG. 1, the water heater system 10 which is adapted for connecting to a water source to obtain water is arranged for providing heated water at a predetermined temperature. The water heater system 10 generally comprises a water heater unit 11 for heating up a predetermined amount of water, and a motorized unit 12 circulating the hot water in a recirculation loop to define one or more user points thereat. The motorized unit 12 generally comprises a booster pump, a boiler pump, and a recirculation pump in the water heater system 10. The boiler pump is located in the water heater system 10 where the boiler and storage tank of the water heater unit 11 are separate that the boiler pump circulates the water from the storage tank back to the storage tank through the boiler. The recirculation pump is located at the recirculation loop to circulate the water back to the water heater unit 11. Accordingly, the hot water is circulated through a pipe to define a deliver line of the recirculation loop to deliver hot water to the user points and a return line of the recirculation loop to return water back to the water heater unit 11.

According to the preferred embodiment, the energy management system will basically implement two primary control strategies to achieve energy saving in the water heater system 10, wherein the energy management system can be incorporated with an existing water heater system or can be integrated with the new water heater system to form an integrated structure. The two primary control strategies are: control of the water heater unit 11 based on user demand, and control the hot water distribution based on demand and water temperature of the recirculation loop. There is a significant improvement on the existing control systems as there is no other control system currently using both two control strategies in the energy management system as a central unit. Having the energy management system, the efficiencies of the water heater system can be maximized.

In addition to the control capabilities of the present invention, the energy management system further incorporates fault detection and diagnostic and automatically sends a notification to the user (an operator) once the energy management system detects that the sequence of operation is out of alignment. This ensures proper operation and a persistence of energy savings. The energy management system further provides users with monitoring feature to view statistical data of the water heater system 10 for any set period of time.

As shown in FIG. 2, the energy management system comprises a control center 20, a management center 30, a diagnostic center 40, and a user interface 50.

The control center 20 is arranged for collecting operational parameter of the water heater system 10 and for collecting real time information of hot water usage at each of the user points.

The management center 30 is operatively linked to the control center 20 for managing the operational parameters of the water heater system 10 and the real time information of the hot water usage, wherein the management center 30 is preset for automatically turning each of the motorized unit 12 and the water heater unit 11 in an on and off manner in responsive to hot water demand at a user point so as to optimize energy saving of the water heater system 10.

According to the preferred embodiment, the control center 20 comprises one or more temperature sensors being located at predetermined locations of the water heater system 10 for obtaining temperature data of the water heater unit 11 and along the recirculation loop so as to enable the management center 30 operatively controlling the motorized unit 12 and the water heater unit 11. The temperature sensors at the recirculation loop will indicate whether hot water is in the pipe, especially at the return line of the recirculation loop.

According to the preferred embodiment, in order to achieve the first primary control strategy of controlling of the water heater unit 11 based on user demand, the management center 30 will automatically turn down the temperature of the water heater unit 11 during periods of low or no demand (preferably based on weekly load profiles) in order to save on gas consumption (or other fuel used for water heating). Water temperature will modulate back up to normal temperatures during high usage periods to ensure occupant satisfaction.

In order to achieve the second primary control strategy of controlling the hot water distribution based on demand and water temperature of the recirculation loop, the management center 30 will automatically turn the recirculation pump of the motorized unit 12 on and off according to demand after the control center 20 detects and collects real time hot water usage at the user point in the building. The recirculation pump will only run where there is a simultaneous signal for hot water demand, and a signal that there is not sufficient hot water in the pipes. Once hot water has circulated through the recirculation loop, the management center 30 will shut the recirculation pump off once again.

The diagnostic center 40 is operatively linked to the control center 20 for diagnosing the operational parameter of the water heater system 10 for promptly and accurately optimizing an operation of the water heater system 10 in a real time basis. Accordingly, the diagnostic center 40 will detect when problems arise in the water heater system 10.

The user interface 50 is operatively linked to the control center 10 for configuring the operational parameter of the water heater system 10 and the real time information of hot water usage at the user points in a digitalized manner so as to enable the management center 30 to be selectively configured to optimize the operation of the water heater system 10.

It is worth mentioning that the management center 30 comprises one or more controllers (or relays) for switching the components of the water heater system 10 on and off. Examples of the components would be the water heater unit 11 or the recirculation pump of the motorized unit 12. By controlling the water heater system 10, the temperature setpoint can be managed by the management center 30. Flow of hot water throughout the building can be controlled with the pump. The management center 30 can be programmed to activate based upon real-time data from the control center 20 and calculations based on the collected data. The management center 30 can be programmed to activate on a timed basis or on a schedule. Programming is expected to be dependent on the site and the components that are at the site. The purpose of the programming is the optimize system lifetime and minimize system energy usage.

Preferably, the temperature data of the water heater system 10 will be obtained and collected by various temperature sensors and the operational parameter of the water heater system 10 will be obtained and collected by various sensing devices as illustrated below. Accordingly, the temperature sensors are placed at the recirculation loop (for example, the piping structure) or near the exhaust or flames. Information such as system diagnostic and health can be tracked using the temperature data. Water heater runtime can be also tracked using temperature data. Based on the temperature data analysis, the diagnostic center 40 will know if all the components of the water heater system 10 are working properly, what is wrong if the components of the water heater system 10 are not working properly, and which component of the water heater system 10 is at fault. Also, energy information can be deduced by temperature data. Finally, any change of the configuration of the water heater system 10 can be tracked, for example someone has turned up the system temperature setpoint.

Temperature sensor input 1 is arranged for obtaining water temperature at the cold water supply of the water heater system 10. Data of the water supply temperature from the temperature sensor input 1 will be captured with a time stamp. A collection interval may be set as 10 minutes.

Temperature sensor input 2 is arranged for obtaining boiler temperature, which desires to use an existing boiler/tank temperature sensor/thermocouple for temperature monitoring. The user is able to set the desired boiler temperature via the user interface 50. The desired temperature will be communicated to the control center 20. When the boiler temperature drops below a preset temperature, the management center 30 will activate a relay 1 to turn on the water heater unit 11. Once the temperature rises a preset temperature deadband, for example, 5 degree deadband, the relay 1 will be deactivated by the management center 30.

Temperature sensor input 3 is arranged for obtaining boiler temperature, which desires to use existing boiler/tank temperature sensor/thermocouple for temperature monitoring. The temperature setting as mentioned of the temperature sensor input 3 will apply to this temperature also, wherein the temperature sensor input 2 and the temperature sensor input 3 are not set independently. When the boiler temperature drops below the preset temperature, the management center 30 will activate a relay 2 to turn on the water heater unit 11. Once the temperature rises a preset temperature deadband, for example, 5 degree deadband, the relay 2 will be deactivated by the management center 30. Accordingly, the relay 1 and the relay 2 will work independently based on the inputs from the temperature sensor input 2 and the temperature sensor input 3 respectively.

Temperature sensor input 4 is for obtaining water temperature at the return of the recirculation loop, wherein the temperature sensor input 4 mainly controls the recirculation pump of the motorized unit 12. Accordingly, the recirculation pump is controlled by the management center 30 in condition that:

(i) If the return temperature is the setpoint (default is 100 degrees F.) or greater for both temperatures from temperature sensor input 4 and temperature sensor input 5, the recirculation pump is not turned on, even with detection of supply line water flow.

(ii) If the return temperature is less than lockout setpoint for either the temperature from temperature sensor input 4 or temperature sensor input 5, the recirculation pump is turned on when supply line sensor (Hall Effect input 1) detects water flow. Then, the recirculation pump is turned off when the return temperature for the lower temperature sensor reading from either temperature sensor input 4 or 5 increases by temperature differential (default differential is 6 degrees per second) if water flow is no longer detected. If water flow continues, the recirculation pump remains on until the lockout temperature is reached.

(iii) The recirculation pump is activated only when water flow is detected and the return temperature is below the lockout temperature. The recirculation pump is shut off only when water flow has stopped and return temperature has risen by the differential, or when water flow continues and return temperature reaches the lockout temperature.

(iv) If the water flow is detected below the lockout temperature, but within the differential temperature range, the recirculation pump will continue to run until the return temperature has risen the differential amount. For example, the lockout temperature is 100 degrees, the differential temperature is 6 degrees, water flow begins when the return temperature is 98 degrees. The recirculation pump will run until the return temperature is 104 degrees.

(v) Once the recirculation pump has been turned off due to the return temperature reaching the lockout temperature, supply line monitor (Hall Effect input 1) must cycle (detect no flow) off for the recirculation pump to be turned on again with the detection of water flow.

Temperature sensor input 5 is set for secondary return loop, as same as the temperature sensor input 3. The energy management system would be controlled by the lower of two input temperatures. This work in parallel to Temperature sensor input 4 as it is mentioned above.

Temperature sensor inputs 6 and 7 are arranged for monitoring burner activity, wherein the temperature sensor inputs 6, 7 would be mounted close to the burner itself to detect heat rise when burner active.

Hall effect input 1 is arranged for supply line flow detection and has control functionality to turn on the recirculation pump. The recirculation pump is turned on with detection water flow unless the return temperature (temperature sensor input 4 or 5) are both at setpoint or greater. Otherwise, the recirculation pump is turned on until the return temperature is increased by 6 degrees per second, or until the setpoint is reached, whichever comes first.

Hall effect input 2 is arranged for detecting and monitoring a vent damper between an open status and a closed status.

A motor detector, which is preferably a magnetic motor detector, is arranged for detecting the status of the motorized unit 12. Accordingly, the motor detector is placed next to the motorized unit 12, such as water pump or recirculation pump) for tracking the one-off status of the motorized unit 12 to obtain electrical energy consumption and to determine when the motorized unit 12 fails or is operating abnormally.

Proximity sensor will detect when a magnet is closed by. This sensor is placed into the flow of water and can detect water flow. The proximity sensor will also be placed on the vent damper (flap) and tracker when the vent damper is opened or closed. Tracking flow allows the control center 20 to know when there is hot water usage at the user point as well as provide water leak detection.

A pulse counter is adapted to connect to a third party meter allowing for the flexibility to track data from a source meter, such as gas meter, water meter, or any meter with pulse output. The user is able to track additional data by connecting the pulse counter to record and track the data remotely.

It is worth mentioning that the relay of the management center 30 is selectively programmable in various manners. For example, the relay is programmed in such a manner that the relay is capable of being activated based upon real-time data collected and/or calculated by the management center 30 through the temperature sensors and pulse counter to control the on/off or the open/close status of the corresponding components of the water heater system 10 respectively. Alternately, the relay is programmed in such a manner that the relays are activated on a scheduled time basis or for a particular time frame respectively. Preferably, the relay is programmed to meet the need of a user based on the precise structure of the water heater system 10 and the peculiarity and usage of the particular location or building structure such that the system of the present invention is optimized with increased lifespan and lowered energy consumption.

After the operational parameters of the water heater system 10 and the real time information of hot water usage at each the user point are collected, the control center 20 will send the operational parameters of the water heater system 10 and the real time information to the diagnostic center 40 for system diagnostic.

The diagnostic center 40 comprises a plurality of diagnostic modules to track different components of the water heater system 10. A temperature diagnostic module 41 is arranged for tracking the water heater runtime by means of water temperature throughout the water heater system 10 via the above mentioned temperature sensor inputs to determine whether the water heater system 10 is working properly. A motor diagnostic module 42 is arranged for tracking an on-off status of the motorized unit 12 of the water heater system 10 via the motor sensor by means of electrical energy consumption to determine whether the motorized unit 12 is working properly. A water flow diagnostic module 43 is arranged for detecting water flow along the recirculation loop via the proximity sensor to track hot water being demanded at each user point and to provide water leak detection. A meter diagnostic module 44 is arranged for tracking data from the source meter of the water heater system 10 via the pulse counter. The diagnostic center 40 comprises an alert module 45 for generating an alert when a faulty event is detected in a real time basis.

Preferably, the diagnostic center 40 will ensure that proper operation will persist by alerting the operator when events fall out of sequence. Alerts will be sent if (i) the temperature is too high; (ii) the water temperature is too low; (iii) the pump runs without ever shutting off; and (iv) the pump never runs. In other words, when any pump of the motorized unit 12 fails to operate or is operated under an abnormal condition, the fail or abnormal condition will be reflected by the data in relation to operation status and electrical energy consumption of the pumps. It is worth mentioning that the magnetic motor sensor can also be replaced by a position or motion sensor of any kind to serve the above purpose.

The user interface 50 comprises a communication unit 51 communicatively linking to the control center 20 to enable the management center 30 to be remotely controlled through the communication unit 51.

The communication unit 51 comprises a remote web-server for dissemination and storage of the operational parameters of the water heater system 10 and the real time information of hot water usage, and a graphical converter for converting the operational parameters of the water heater system 10 and the real time information of hot water usage into customizable and viewable graph displays to be monitored through the web-server.

According to the preferred embodiment, the communication unit 51, which acts as a gateway for the management center 30, is arranged for sending and receiving signals to and from the management center 30. Preferably, the communication unit 51 enables a two-way communication via cellular, WIFI and/or wired Internet transmission for transmitting signals from the management center 30 to a user terminal 52. The communication unit 51 is arranged for transmitting signals containing data from the management center 30 to the user terminal 52, which can be a computer, a server, a central processing machine, a cellular phone, a handheld device or the like, such that the user can remotely obtain the data, monitor and control the system on a real-time basis. Accordingly, the user can remotely monitor the water heater 10, see the temperatures of different locations of the pipe and obtain the on/off status of the pumps of the motorized unit 12.

Preferably, the web server can be a complimentary web application adapted for being installed on the user terminal 52 for receiving and translating signals from the management center 30 through the communication unit 51 for visually displaying the data of the control center 20, and for generating and sending commands to the management center 30 through the communication unit 51. For example, the web application may include basic system status information and alert logs viewable and remotely accessible by the user in an off-site location. The web application may also be arranged to include a plurality of alerts which are sent through email or SMS messages to the user for alerting the user. For example, when the data representing an out of correct sequence of operation is received from the management center 30, an email or a SMS message is sent to the user to alert the user of the failure of the system. In other words, through the web application and the energy management system incorporating into the water heater system 10, fault notifications are able to be detected and sent to the user promptly on an approximately real-time basis.

The web server further acts as a digital interface for the water heater system 10 such that different components of the water heater system 10 which are mechanical in nature are now programmable. In particular, the web server enables command generation and transmission to the management center 30 through the communication unit 51 for remotely controlling the temperature of the water heater unit 11 and adjusting the on/off status of the motorized unit 12. In other words, the user can remotely adjust the temperature of the water heater unit 11 or switch on or off the motorized unit 12 through the web server through the user terminal 52. For example, when the user wants to decrease the temperature of the water heater unit 11 while away home, he or she can just make use of his or her cellular phone to remotely control the temperature of the water heater unit 11.

Moreover, the provision of the web server on the user terminal 52 not only provides a web-based monitoring feature for the user to view statistical data of a particular energy management system for a water heater system 10 at a particular period of time, but also provides a user friendly interface showing data of the energy management system graphically for the user to perceive easily.

In other words, the user can monitor the water heater system 10 through the management center 30 communicating with the user terminal 52 at which the user terminal 52 is located. Since the user terminal 52 can be located at an on-site location or an off-site location, the physical location of the user terminal 52 is not restricted by the location of the water heater system 10 and the management center 30.

It is worth mentioning that the water energy management system of the present invention can facilitate central management of two or more water heater systems 10 of which each water heater system 10 is equipped with one management center 30. Therefore, a management company specialized in hot water management can make use of the water energy management system of the present invention for centralizing the monitoring and control of the water heater systems 10 at different locations, irregardless of the geographical locations of the water heater systems 10.

It is worth mentioning that the water energy management system according to the preferred embodiment of the present invention incorporates both a water temperature reset based on demand and hot water delivery on demand for lowering the energy consumption, while allowing remote control and monitoring of the system.

In particular, energy consumption is reduced due to reducing energy consumption by allowing water temperature to be decreased during periods of non-use; minimizing heat loss during hot water delivery in the pipe through the provision of a circulation loop which is operated on demand; and reducing energy consumption of the pump which is operated on demand through delivery of hot water only on user's demand. Moreover, the provision of alerts to the user can timely notify the user and hence ensure the proper operation and maintenance of the system, hence continuously monitoring the energy consumption at a controlled and low level.

Figure 4:
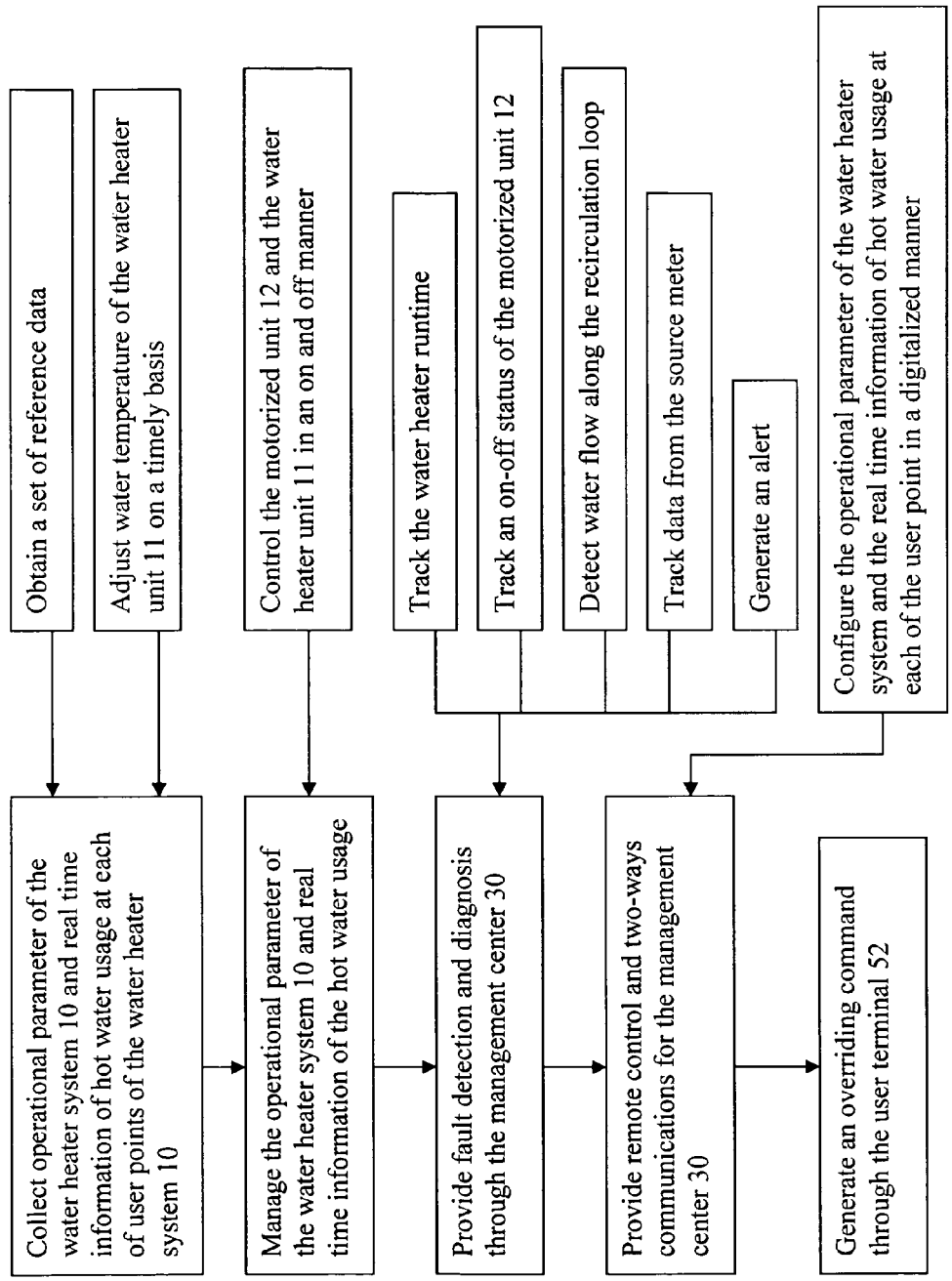
FIG. 4 is a flow diagram of the energy management system according to the above preferred embodiment of the present invention.

Referring to FIG. 4 of the drawings, the present invention also provides a management method for the energy management system to reset water temperature and demand controlled distribution, for detecting fault representing improper operation, collect and store data and provide remote access. In particular, the method comprises the following steps.

(1) Collect operational parameters of the water heater system 10 and real time information of hot water usage at each of user points of the water heater system 10. Accordingly, temperature data of the water heater unit 10 and along the recirculation loop will be obtained by the temperature sensors of the control center 20.

(2) Manage the operational parameters of the water heater system 10 and real time information of the hot water usage for automatically turning the motorized unit 12 and the water heater unit 11 in an on and off manner in responsive to hot water demand at a user point so as to optimize energy saving of the water heater system 10.

(3) Provide fault detection and diagnosis through the management center 30.

(4) Provide remote control and two-ways communications for the management center 30.

According to the preferred embodiment, the energy management system can be preprogrammed or pre-run to obtain a set of reference data by the control center 20, wherein the preset method comprises the following steps.

(A) Preprogram the management center 30 and preset a plurality of set-points for a preset number of parameters of the water heater system 10, wherein the parameters include at least a temperature parameter and a pump status parameter. Accordingly, the water energy management system is set up for monitoring and collecting setting data for a preset period of time through the management center 30. The set-points of the water heater system 10 are based on the setting data. Preferably, the preset period of time is about one week. In step (a), the set-points can be sensor-based set-points and/or time-based set-points. The sensor-based set-points provide 'if—then' commands while the time-based set points provide time-setting commands such as "time of the day", "day of the week", "week of the month", "month of the year" and "season of the year" commands.

(B) Adjust the temperature parameter of the water heater unit 11 based on the set-point for the temperature parameter of the water heater system 10 and hot water demand through the control center 20.

(C) Adjust the pump status parameter of the pump of the motorized unit 12 based on the hot water demand through the control center 20.

Preferably, in step (B), the temperature parameter of the water heater unit 11 is automatically turned down from the preset standard level when the hot water demand falls below a preset level of hot water demand such that energy consumption for heating water is controlled and lowered, and the temperature parameter of the water heater unit 11 is automatically modulated up to the preset standard level when the hot water demand increases to the preset level of hot water demand so as to fulfill the need of hot water demand to ensure sufficient hot water supply.

Preferably, the pump status parameter includes an on/off status for the motorized unit 12. When the motorized unit 12 has an on status, the motorized unit 12 is running to deliver and circulate heated water in the recirculation loop. When the motorized unit 12 has an off status, the motorized unit 12 stops running.

In particular, the hot water demand is determined through the control center 20. The temperature sensors are arranged to detect the presence or absence of hot water demand and to detect a returned loop temperature, which is the temperature of the recirculation loop at a position proximal to the heated water inlet. The returned loop temperature indicates whether hot water is in the pipe to determine the sufficiency of hot water supply. When the control center 20 detects that the hot water demand is present and the hot water supply is not sufficient, the management center 30 then sends out a pump command to the pump, which is the recirculation pump in this case, to turn on the recirculation pump. In the absence of simultaneous existence of the conditions that the hot water demand is present and the hot water supply is not sufficient, the recirculation pump is controlled to shut off.

In other words, the motorized unit 12 is controlled in condition that:

(i) the motorized unit 12 is turned on when there is hot water demand at the user point;

(ii) the motorized unit 12 is turned on when there is not sufficient hot water along the recirculation loop; and (iii) the motorized unit 12 is turned off when hot water is circulated back to the water heater unit 11 through the recirculation loop.

In the step (3), the fault detection and diagnosis is arranged to ensure the proper operation and persistent energy savings over time. In particular, the sequence of operation of the water heater unit 11 and the motorized unit 12 are maintained and monitored. When a fault event is detected, the diagnostic center 40 will generate an alert which is then sent to the user terminal 52 for alerting the user in a real time basis. The fault event includes temperature parameter falling out of range, improper functioning of the pump or the like.

For example, when a fault event is detected, such as when the water temperature is too high or too low, or when the pump keeps running without ever shutting off or never runs, an alert will be generated by the diagnostic center 40 and transmitted to the user terminal 52 to alert the user such that immediate attention to the fault event is timely diagnosis and fixed, if required.

In particular, the diagnosing step comprises the following steps.

(3.1) Track the water heater runtime by means of water temperature throughout the water heater system 10 to determine whether the water heater system 10 is working properly.

(3.2) Track an on-off status of the motorized unit 12 of the water heater system 10 by means of electrical energy consumption to determine whether the motorized unit 12 is working properly;

(3.3) Detect water flow along the recirculation loop to track hot water being demanded at each user point and to provide water leak detection; and (3.4) Track data from the source meter of the water heater system 10.

According to the preferred embodiment, the operational parameters of the water heater system and the real time information of hot water usage are useful for dissemination and analysis in relation to the functionality of the system. Preferably, the operation data is stored on a remote web-server which is arranged to convert into customizable graphs viewable on the user terminal 52. This is important for providing a continuously monitoring of the system.

In the step (4), the operational parameters of the water heater system and the real time information of hot water usage at each of the user points can be selectively configured in a digitalized manner so as to enable the management center 30 being selectively configured to optimize the operation of the water heater system 10.

The management center 30 is adapted for communicating with the user terminal 52, in which a web application is installed for establishing communicative connection via the communication unit 51. Preferably, the web application is capable of providing a digital interface such as a web-based front end graphical interface which is viewable on the user terminal 52. Accordingly, the user can make use of the user terminal 52 to communicate with the management center 30 to control, monitor, and configure the operation of the water heater system 10. This feature is particular important for property management. For example, when an occupant of an apartment unit turns up the temperature parameter of the water heater unit 11, the manager of the apartment unit will be able to remotely control and adjust the temperature parameter of the water heater unit 11 in the apartment through the user terminal 52, so as to optimize the cohesive operation of water heater system 10.

Accordingly, the method further comprises the following steps.

(5) Generate an overriding command through the user terminal 52 to electrically controlling the water heater unit 11, the ventilation unit and the motorized unit 12 to switch between an on or off status respectively.

It is worth mentioning that the management center 30 is preset with a plurality of fault settings corresponding to indications of a plurality of fault events respectively, wherein the fault settings are based on the temperature parameter and the on and off status of the water heater unit, the ventilation unit and the motorized unit 12, wherein the diagnostic center 40 will generate an alert to the user terminal 52 when a fault event occurs.

In other words, through the continuous and persistence monitoring of the water heater system 10 in a cohesive manner which puts the water heater unit 11, the recirculation loop and the motorized unit 12 into considerations, the method of the present invention prevents excessive energy consumption in heating water, prevents abuse or unwise adjustment of parameters only taking one single component into account, and facilitates central and remote control over the water heater system 10.

It is worth mentioning that the water heater system 10 with energy management system of the present invention can also be used in a multi-family unit or in a multi-unit building structure such as apartment building or commercial complex as long as the capacity of the water heater unit 11 is sufficient to meet the demand of hot water in the multi-family unit. Moreover, it is also possible to include more than one water heater unit 11 under the water system 10.

In addition, one user terminal 52 can be used to communicate with a plurality of management centers 30 connecting to a plurality of water heater systems 10 respectively. In other words, the user terminal 52 can be a central server for a plurality of management centers 30, and is arranged to communicate with other user terminals 52 as desired.

An exemplary illustration of the water energy management system installed in a multi-family building unit residential building structure having four units comprises a water heater system 10 and a management center 30, which are basically of the same construction and design as described above and are further described as follows.

The management center 30 contains a plurality of parameter settings for controlling the operation of the recirculation pump in relation to temperature parameters. In particular, a default setpoint point temperature, a lockout temperature which is the maximum return temperature, and a differential temperature which is the temperature increase per second required to turn the recirculation pump off are defined. The recirculation pump is controlled to or stayed at the off status when the return temperature detected is or greater than the setpoint temperature. The recirculation pump is controlled to the on status only when a water flow is detected and the return temperature detected is below the lockout temperature. The recirculation pump is controlled to the off status when the water flow is not detected and the return temperature detected has reached the differential temperature, or when the water flow is detected and the return temperature reaches the lockout temperature.

For example, when the default setpoint temperature is 100° F., the lockout temperature is 100° F., the differential temperature is 6° F., and the water flow is detected when the return temperature detected is 98° F., then the recirculation pump 133 will be controlled to run until the return temperature is 104° F.

The proximity sensor on the vent damper which detects the open/close status and runtime of the vent damper is arranged to provide data in relation to a transition event with a time stamp, which is important for monitoring functionality of the management system.

In other words, instead of the sole consideration of the boiler out temperature, the management center 30 is capable of making use of temperature at different locations of the water heater unit 11 and the pipe, and the status of the motorized unit 12 and vent damper to monitor the water heater system 10 in a cohesive manner, such that comprehensive consideration for the whole water heater system 10 is taken into account for achieving energy saving.

In addition, the operation of communication unit 51 and the relay, which provides remote access and control flexibility, has further realized real-time alerts generation and transmission.

The diagnostic center 40 contains a plurality of fault settings adapted for alerting a user on a timely basis when a fault event occurs. The alert settings are based on the temperature at different positions of the water heater system 10 and the status of the motorized unit 12 and the vent damper to define the fault event, which will be timely reported to the user. The fault settings are adjustable according to the actual work conditions of the water heater system 10 and the fault events includes the temperature detected at a particular location of the water heater system 10 falling out of range, the status of the motorized unit 12 or the vent damper is inconsistent with other components of the water heater system 10. For examples, the fault events may include situations where the supply temperature as detected is above the default setpoint level, the return temperature is higher or lower than a particular level, the recirculation pump is not turned on for a particular period of time or is running continuously for more than a particular period of time, the water flow of the water supply is not detected for a period of time or the water flow of the water supply is detected continuously for a period of time, and the vent damper is detected to have no motion for a period of time. The above fault events are useful for control and monitoring, and are particularly useful for detecting improper functioning or water leakage. Accordingly, the continuous monitoring of different components of the water heater system 10 is vital for persistent energy management, both for minimizing energy consumption and energy loss for improper functioning.

The relay of the management center 30 and the communication unit 51 work together to provide remote access and control to the user. The overriding property of the switches of the relay through remote access and control can effectively enable central management of the water heater system 10. In particular, the real-time data of the different components of the water heater system 10 is transmitted to the user terminal 52 through the communication unit 51, the user is capable of having an overview of the whole picture of the system and remotely control the switches of the relay to correct any improper functioning, or is capable of identifying a failed part to be fixed by a technician.

It is worth mentioning that the on and off status of the motorized unit 12 and the ventilation unit, and the temperature at different locations of the water heater system 10 are clearly shown through graphical representations. Accordingly, the user can easily obtain an overview picture of the water heater system 10 through the digital interface in the remotely located user terminal 52.

One skilled in the art will understand that the embodiment of the present invention as shown in the drawings and described above is exemplary only and not intended to be limiting.

It will thus be seen that the objects of the present invention have been fully and effectively accomplished. Embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An energy management system for a water heater system for delivering hot water to a plurality of user points fed from a recirculation pipe loop, the water heater system including a water heater unit and a motorized unit circulating said hot water in the recirculation pipe loop which connects from an outlet of the water heater unit to a return inlet of the water heater unit, to deliver hot water to the user points, the recirculation pipe loop including a delivery line to deliver hot water to the user points and a return line connected to the return inlet, wherein said energy management system comprises:

a sensor system for collecting operational parameters of said water heater system and for collecting real time information of hot water usage at one or more of the user points, said sensor system comprising a plurality of temperature sensors, including a first temperature sensor for collecting return water temperature data of water in the return line or at the return inlet, and a second temperature sensor for collecting water heater unit temperature data, and a supply water flow sensor for detecting supply water flow into the water heater unit; and a programmable management center controller operatively linked to said sensor system for managing said operational parameters of said water heater system and said real time information of said hot water usage, wherein said management center controller is structured to automatically turn each of said motorized unit and said water heater unit on and off in response to hot water demand at said one or more user points so as to optimize energy saving of said water heater system, wherein said management center controller is configured to turn said motorized unit on in response to said supply water sensor indicating that hot water is being demanded at one or more of the user points and if the water temperature sensed at the return inlet or return loop is below a first predetermined temperature, and to subsequently turn the motorized unit off when supply water flow has stopped and either the temperature sensed at the return inlet or return loop has risen by a predetermined temperature differential from the temperature sensed when supply water flow was detected, or when a rate of temperature increase in hot water sensed at the return inlet or return loop exceeds a predetermined temperature differential rate.

2. The energy management system, as recited in claim 1, further comprising a user interface operatively linked to said sensor system and to said management center controller for monitoring said operational parameters of said water heater system and said real time information of hot water usage at said one or more of the user points in a digitalized manner.

3. The energy management system, as recited in claim 2, wherein said user interface comprises a communication unit communicatively linking to said management center controller to enable remote control of said management center controller through said communication unit, said communication unit configured for two-way communication with an off-site user terminal.

4. The energy management system, as recited in claim 3, wherein said communication unit comprises a remote web-server for dissemination and storage of said operational parameters of said water heater system and said real time information of hot water usage, and a graphical converter for converting said operational parameters of said water heater system and said real time information of hot water usage into a customizable and viewable graph display to be monitored through said web-server.

5. The energy management system of claim 1, wherein said management center controller is further configured to turn the motorized unit off if the supply flow has stopped and the return temperature has risen by a temperature differential.

6. The energy management system of claim 1, wherein: the management center controller is further configured to respond to an overriding command from a user terminal linked to the management center controller to electrically control the water heater unit, and the motorized unit to switch between an on or off status respectively.

7. The energy management system of claim 1, wherein the sensor system further includes a sensor for monitoring an open/close status of a vent damper for the water heater unit.

8. The system of claim 1, wherein said management center controller is further configured to automatically lower the water temperature of said water heater unit during periods of low or no demand of hot water thereof, and to modulate back to a normal preset water temperature during high usage periods of hot water.

9. The system of claim 1, wherein the management center controller is further configured to turn said motorized unit off while supply water flow continues and the water temperature sensed at the return inlet or return loop exceeds said first predetermined temperature, or the rate of rise of the water temperature sensed at the return inlet or return loop exceeds a predetermine rate of rise.

10. The energy management system of claim 9, wherein said management center controller is further configured to turn the motorized unit on after it has been turned off due to the return water temperature sensed at the return inlet or return loop exceeding said first predetermined temperature only if the water supply flow data indicates that no supply flow has been detected following said turning off of the motorized unit.

11. A method of energy management for a water heater system for delivering hot water to a plurality of user points fed from a recirculation pipe loop, the system a water heater unit and a motorized unit circulating hot water through the recirculation pipe loop which connects from an outlet of the water heater unit to a return inlet of the water heater, the recirculation pipe loop including a deliver line to deliver hot water to the user points and a return line connected to the return inlet, the method comprising the steps of:
(a) collecting operational parameters of said water heater system and collecting real time information of hot water usage at one or more of the user points of said water heater system, said collecting comprising collecting temperature data of water in the water heater unit, supply water temperature data, and return temperature data of water in the return line or at the return inlet, and collecting water supply flow data indicating supply water is flowing into the water heater unit in response to hot water demand at one or more of the user points; and
(b) managing said operational parameters of said water heater system and processing said real time information of said hot water usage to automatically turn said motorized unit and said water heater unit in an on and off manner in response to hot water demand at said user points so as to optimize energy saving of said water heater system, comprising turning said motorized unit on when hot water is being demanded at one or more of the user points and a sensed water temperature at the return inlet or return loop is below a first predetermined temperature, and for subsequently turning the motorized unit off when supply water flow has stopped and the temperature at the return inlet or return loop has risen by a predetermined temperature differential from said sensed water temperature, or when a rate of temperature increase at the return inlet or return loop exceeds a predetermined temperature differential rate.

12. The method as recited in claim 11, wherein, in the step (b), said water heater unit is controlled for automatically lowering down the water temperature of said water heater unit during periods of low or no demand of hot water thereof, and is modulated back to a normal preset water temperature during high usage periods of hot water.

13. The method, as recited in claim 11, further comprising a step of diagnosing said operational parameters of said water heater system for promptly and accurately optimizing an operation of said water heater system in a real time basis.

14. The method, as recited in claim 11, further comprising a step of selectively configuring said operational parameters of said water heater system and said real time information of hot water usage at said one or more user points in a digitalized manner.

15. The method, as recited in claim 14, wherein the configuring step comprises the steps of: converting said operational parameter of said water heater system and said real time information of hot water usage into customizable and viewable graph display; and remotely configuring said operational parameter of said water heater system and said real time information of hot water usage via a web-server.

16. The method of claim 11, wherein said subsequently turning the motorized unit off of step (b) further comprises turning the motorized unit off if the supply flow has stopped and the return temperature has risen by a temperature differential.

17. The method of claim 11, further comprising:
generating an overriding command through a user terminal to electrically control the water heater unit, and the motorized unit to switch between an on or off status respectively.

18. The method of claim 11, wherein said managing said operational parameters of said water heater system and processing said real time information for turning said motorized unit on and for subsequently turning the motorized unit off further comprises turning the motorized unit off while supply water flow continues and the water temperature sensed at the return inlet or return loop exceeds said first predetermined temperature, or the rate of rise of the water temperature sensed at the return inlet or return loop exceeds a predetermine rate of rise.

19. The method of claim 18, wherein said step (b) further comprises turning the motorized unit on after it has been turned off due to the return water temperature sensed at the return inlet or return loop exceeding said first predetermined temperature only if the water supply flow data indicates that no supply flow has been detected following said turning off of the motorized unit.

20. A method of energy management for a water heater system which comprises a water heater unit and a motorized unit circulating hot water through a recirculation loop, comprising the steps of:
(a) collecting operational parameters of said water heater system and collecting real time information of hot water usage at one or more user points of said water heater system;
(b) managing said operational parameter of said water heater system and said real time information of said hot water usage for automatically turning said motorized unit and said water heater unit in an on and off manner in responsive to hot water demand at said one or more user points so as to optimize energy saving of said water heater system;

(c) diagnosing said operational parameters of said water heater system for promptly and accurately optimizing an operation of said water heater system in a real time basis, wherein the diagnosing step comprises the steps of: tracking the water heater runtime by means of water temperature throughout said water heater system to determine whether said water heater system is working properly; tracking an on-off status of said motorized unit of said water heater system by means of electrical energy consumption to determine whether said motorized unit is working properly; detecting water flow along said recirculation loop to track hot water being demanded at said one or more user points and to provide water leak detection; and tracking data from a source meter of said water heater system.

21. A central water heater arrangement, comprising:

one or more water heater systems for delivering hot water to one or more user points fed from a recirculation pipe loop which connects from an outlet of the water heater unit to a return inlet of the water heater unit, each water heater system comprising a water heater unit for heating up water, a motorized unit circulating said hot water in the recirculation loop to the one or more user points, the recirculation pipe loop including a delivery line to deliver hot water to the user points and a return line connected to the return inlet; and an energy management system which comprises:

a sensor system for collecting operational parameters of said water heater system and for collecting real time information of hot water usage by the said one or more user points;

a programmable management center controller operatively linked to said sensor system for managing said operational parameters of said water heater system and monitoring said real time information of said hot water usage, wherein the management center controller is programmed to automatically turn on and off said motorized unit and said water heater unit to conserve energy usage by the water heater system, wherein said management center controller is configured to turn said motorized unit on in response to said supply water sensor indicating that hot water is being demanded at one or more of the user points and if the water temperature sensed at the return inlet or return loop is below a first predetermined temperature, and to subsequently turn the motorized unit off when supply water flow has stopped and the temperature at the return inlet or return loop has risen by a predetermined temperature differential above said sensed water temperature or when a rate of temperature increase sensed at the return inlet or return loop exceeds a predetermined temperature differential rate; and a user interface operatively linked to said sensor system and said management center controller for configuring said operational parameters of said water heater system and said real time information of hot water usage in a digitalized manner.

22. The central water heater arrangement, as recited in claim 21, wherein said user interface comprises a communication unit communicatively linking to said management center controller to enable remote control of said management center controller through said communication unit, said communication unit configured for two-way communication with an off-site user terminal.

23. The central water heater arrangement, as recited in claim 22, wherein said communication unit comprises a remote web-server for dissemination and storage of said operational parameters of said water heater system and said real time information of hot water usage, and a graphical converter for converting said operational parameters of said water heater system and said real time information of hot water usage into a customizable and viewable graph display to be monitored through said web-server.

24. The water heater arrangement, as recited in claim 21, wherein the water heater system is installed in a multi-family unit or in a multi-unit building structure.

25. The system of claim 21, wherein the management center controller is further configured to turn said motorized unit off while supply water flow continues and the water temperature sensed at the return inlet or return loop exceeds said first predetermined temperature, or the rate of rise of the water temperature sensed at the return inlet or return loop exceeds a predetermine rate of rise.

26. The system of claim 21, wherein said management center controller is further configured to automatically lower the water temperature of said water heater unit during periods of low or no demand of hot water thereof, and to modulate back to a normal preset water temperature during high usage periods of hot water.

* * * * *